United States Patent
Taneja et al.

(10) Patent No.: US 9,300,912 B2
(45) Date of Patent: Mar. 29, 2016

(54) SOFTWARE BASED WHITEBOARD CAPTURE SOLUTION FOR CONFERENCE ROOM MEETINGS

(75) Inventors: Puneet Taneja, Bellevue, WA (US); Li-Wei He, Redmond, WA (US); Shiran Sathananthan, Redmond, WA (US); Eric Sather, Seattle, WA (US); Vivek Ramamoorthy, Issaquah, WA (US); Anil Kommineni, Sammamish, WA (US); Paul Egger, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1405 days.

(21) Appl. No.: 12/057,936

(22) Filed: Mar. 28, 2008

(65) Prior Publication Data

US 2009/0244278 A1    Oct. 1, 2009

(51) Int. Cl.
| | |
|---|---|
| *H04N 7/18* | (2006.01) |
| *H04N 7/15* | (2006.01) |
| *G06Q 10/10* | (2012.01) |
| *H04N 7/14* | (2006.01) |
| *H04L 12/18* | (2006.01) |

(52) U.S. Cl.
CPC .................. *H04N 7/15* (2013.01); *G06Q 10/10* (2013.01); *H04L 12/1831* (2013.01); *H04N 7/147* (2013.01); *H04L 12/1827* (2013.01)

(58) Field of Classification Search
CPC ......... G06Q 10/10; H04N 7/15; H04N 7/147; H04L 12/1831; H04L 12/1827
USPC ........................................................ 348/143
See application file for complete search history.

(56) References Cited

U.S. PATENT DOCUMENTS

| | | | |
|---|---|---|---|
| 5,528,290 A | 6/1996 | Suand | 348/218 |
| 6,285,392 B1 * | 9/2001 | Satoda et al. | 348/14.09 |
| 6,724,373 B1 * | 4/2004 | O'Neill et al. | 345/179 |
| 6,802,611 B2 | 10/2004 | Chu et al. | 353/28 |
| 6,816,185 B2 * | 11/2004 | Harmath | 348/157 |
| 7,224,847 B2 | 5/2007 | Zhang et al. | 382/254 |
| 7,260,257 B2 | 8/2007 | Zhang et al. | 382/156 |
| 7,265,854 B1 * | 9/2007 | Hohensee et al. | 358/1.15 |
| 7,301,548 B2 | 11/2007 | Zhang et al. | 345/634 |
| 2004/0080768 A1 * | 4/2004 | Larson | 358/1.13 |
| 2004/0175042 A1 | 9/2004 | Kroeker et al. | 382/192 |
| 2004/0263636 A1 | 12/2004 | Cutler et al. | 348/211.12 |
| 2005/0216556 A1 * | 9/2005 | Manion et al. | 709/204 |
| 2005/0262201 A1 | 11/2005 | Rudolph et al. | 709/205 |
| 2006/0284981 A1 * | 12/2006 | Erol et al. | 348/207.1 |
| 2007/0024714 A1 * | 2/2007 | Kim et al. | 348/207.99 |
| 2008/0130963 A1 * | 6/2008 | Sakaue | 382/125 |

OTHER PUBLICATIONS

Whiteboard Photo Note Capturing Software by PolyVision http://www.polyvision.com/products/wbp.asp.
Whiteboard Scanning and Image Enhancement http://research.microsoft.com/~zhang/Papers/TR03-39.pdf.

(Continued)

*Primary Examiner* — Joseph Greene
(74) *Attorney, Agent, or Firm* — Tom Wong; Micky Minhas

(57) ABSTRACT

Whiteboard contents are captured through a combination of hardware and software components such as a webcam and a capture application executed in a PC or a video conference system components. The captured content can be stored, used in an online meeting, processed, made available or transmitted to participants and others.

20 Claims, 8 Drawing Sheets

(56) References Cited

OTHER PUBLICATIONS eBeam Interactive Whiteboard Technology http://reflex-digital.co.uk/pdf/EBEAMINTERACTIVBLT.pdf.

Investigating the Capture, Integration and Access Problem of Ubiquitous Computing in an Educational Setting http://delivery.acm.org/10.1145/280000/274704/p440-abowd.pdf?key1=274704&key2=5962830021&coll=GUIDE&dl=GUIDE&CFID=12281404&CFTOKEN=76102659.

NoteLook: Taking Notes in Meetings with Digital Video and Ink http://www.fxpal.com/publications/FXPAL-PR-99-117.pdf.

Pattern Classification Book Not Downloaded.

Analysis of Gesture and Action in Technical Talks for Video Indexing http://ieeexplore.ieee.org/iel3/4821/13322/00609386.pdf?tp=&isnumber=&arnumber=609386.

High-Quality Linear Interpolation for Demosaicing of Bayer-Patterned Color Images http://research.microsoft.com/~rcutler/pub/Demosaicing_ICASSP04.pdf.

"I'll Get That Off the Audio": A Case Study of Salvaging Multimedia Meeting Records http://www.fxpal.com/people/chiu/paper-mphckmvz-CHI97.pdf.

Tivoli: An Electronic Whiteboard for Informal Workgroup Meetings http://delivery.acm.org/10.1145/170000/169309/p391-pedersen.pdf?key1=169309&key2=2503830021&coll=ACM&dl=ACM&CFID=12282005&CFTOKEN=17750272.

Robust Regression and Outlier Detection Book Not Downloaded.

VoiceNotes: A Speech Interface for a Hand-Held Voice Notetaker http://www.media.mit.edu/speech/people/lisa/interchi93.html.

Image Mosaicing and a Diagrammatic User Interface for an Office Whiteboard Scanner Not Found.

Marquee: A Tool for Real-Time Video Logging http://delivery.acm.org/10.1145/200000/191697/p58-weber.pdf?key1=191697&key2=5513830021&coll=&dl=&CFID=49945694&CFTOKEN=88975599.

A Dynamically Organized Ink and Audio Notebook http://web.media.mit.edu/~nitin/papers/dynomite_chi97.pdf.

Handwritten notes provide access to recorded conversations http://delivery.acm.org/10.1145/270000/260380/p219-whittaker.pdf?key1=260380&key2=0723830021&coll=portal&dl=ACM&CFID=49946084&CFTOKEN=50872930.

Communication and Information Retrieval with a Pen-Based Meeting Support Tool http://delivery.acm.org/10.1145/150000/143539/p322-wolf.pdf?key1=143539&key2=8633830021&coll=portal&dl=ACM&CFID=49946296&CFTOKEN=30449830.

Use the Whiteboard Capture System http://research.microsoft.com/~zliu/whiteboard.pdf.

* cited by examiner

SOFTWARE BASED WHITEBOARD CAPTURE SOLUTION FOR CONFERENCE ROOM MEETINGS

BACKGROUND

Conference meeting rooms are a common feature of modern work space. A conference meeting room may be used for exchange of ideas between people from two to as many as the room can accommodate. Because exchange of ideas in meetings, including video conference meetings, are an important aspect of daily life for businesses and other organizations, conference meeting rooms are typically equipped with tools that assist participants in capturing the discussions during the meeting. A simple, but effective, tool is a whiteboard. Participants may draw or write on the whiteboard over and over during a meeting. However, capturing the content on a whiteboard efficiently and in a user-friendly way is a challenge.

Manual note-taking, scanning and printing whiteboard contents are some of the methods commonly employed, each presenting their own disadvantages. For example, printer based systems may be expensive depending on the details that are desired to be captured (e.g. color, resolution). Moreover, the printed content has to be reproduced for each participant and manually distributed. Some of the more sophisticated solutions involve combinations of hardware and software and are typically costly and difficult to use.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to capturing whiteboard contents through a combination of hardware and software components in an efficient, cost-effective, and user-friendly manner such that captured content may be stored, used in an online meeting, transmitted to participants and others. Cost-efficient equipment such as webcams and in-room or networked computers, or existing video conferencing equipment in a meeting room may be utilized to perform tasks associated with a system according to embodiments.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, whiteboard contents may be captured through a combination of hardware and software components in an efficient and user-friendly manner such that captured content may be stored, used in an online meeting, transmitted to participants and others. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
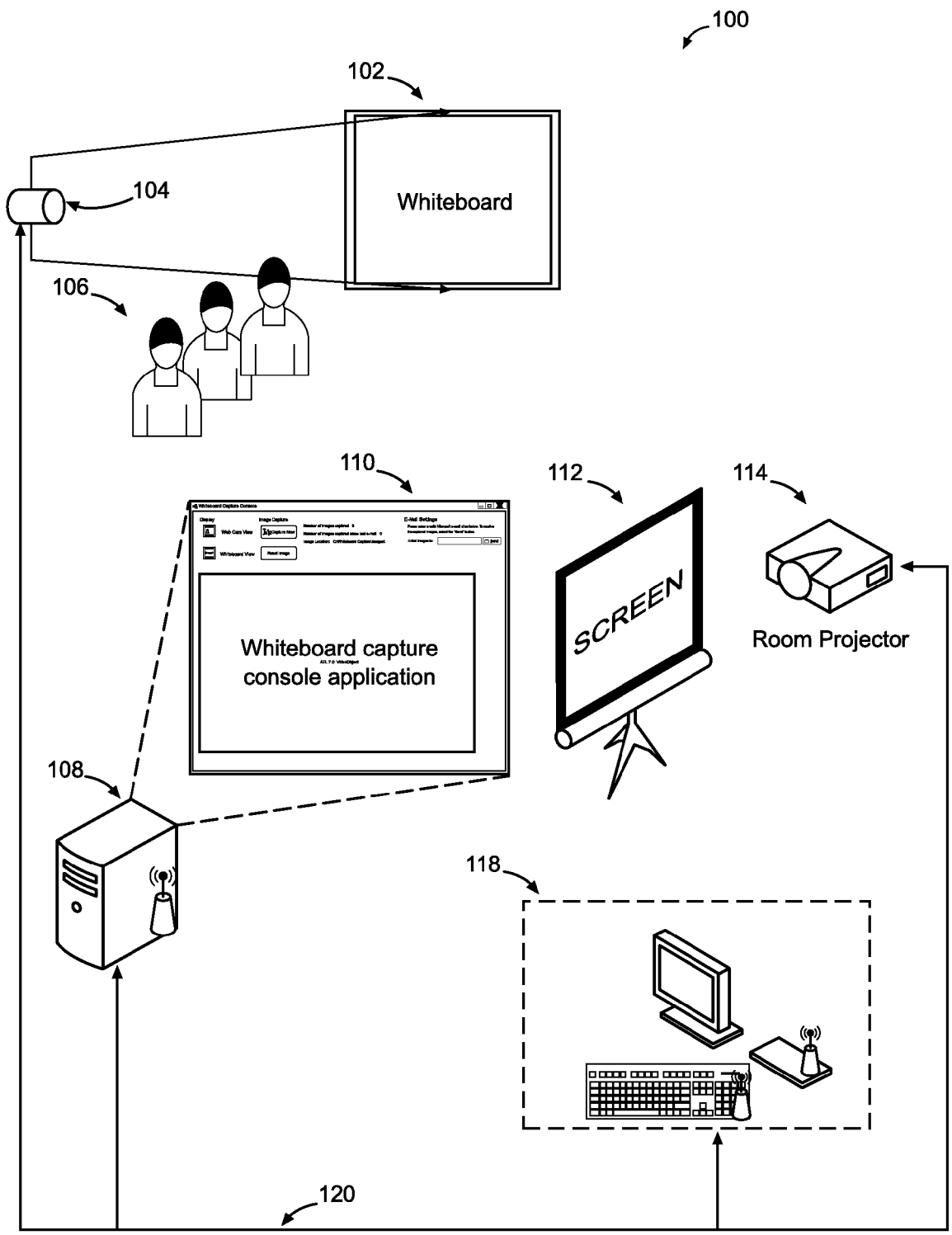
FIG. 1 is a conceptual diagram illustrating main components in a whiteboard capture system according to embodiments.

Referring to FIG. 1, a conceptual diagram illustrating main components in a whiteboard capture system 100 according to embodiments is provided. As discussed above, modern business life is intimately tied with meetings, online or offline. With the proliferation of Internet-based communication tools and applications, video applications that provide video communication over private or public networks have grown in number and variety. Thus, online meetings involving remotely located team members are also a common part of daily life. Most such meetings still take place in conference rooms where ideas are transcribed on whiteboards, figures drawn, presentations provided, etc. Therefore, capturing content presented on whiteboards and having the ability to distribute them to local as well as remote meeting attendees and to those who could not attend meeting in person provides an important tool for follow-ups on meetings, future meetings, and so on.

Existing solutions are either cumbersome (e.g. manual transcription) expensive (e.g. smart scanning and/or printing technologies) or both (complicated board capture technologies, that may end up being too cumbersome for meeting participants to utilize). On the other hand, many conference rooms are outfitted with a computing device (e.g. in-room PC 108) or connection to a networked computing device through wired or wireless means. Proliferating image capture and online communication technologies have resulted in low cost, high quality image capture devices such as webcams. According to some embodiments of the present disclosure, a combination of a low cost image capture device, an in-room or networked computing device, and a software application for processing the captured image(s) may be used to provide a user-friendly, cost-efficient, and easy-to-integrate solution for capturing conference room whiteboard content and its distribution within the framework of an organization's information technology infrastructure.

A system 100 according to one embodiment comprises an image capture device 104 (e.g. a webcam, a digital camera, etc.) configured to capture the contents of a whiteboard 102. Users 106 are participants of a meeting in a conference room equipped with the system 100, and may create, modify, and delete the content on whiteboard 102. At the end of the meeting (or during the meeting), it may be desirable to provide the participants with captured version of the whiteboard contents electronically or mechanically. Furthermore, the captured contents may be desired to be forwarded to people other than just the participants.

Image capture device 104 may be connected to a computing device through wired or wireless means (120), the computing device including an in-room PC (108), a network server, a remote client device, and so on. The computing device (in-room PC 108) may execute a whiteboard capture application with a user interface 110 for interacting with the meeting participants through peripheral devices 118 such as a monitor, a mouse, a keyboard, and so on. The peripheral devices may be connected to the computing device through wired or wireless means. Similarly, a connected room projector 114 may also be part of the system 100 projecting the captured whiteboard image and other images (e.g. a presentation, a video conference image stream) to screen 112. Thus, the captured whiteboard contents may even be integrated into other electronic media utilized as part of the meeting.

The whiteboard capture application may be configured to present users (participants or even a remote administrator) captured content, enable them to configure image capture and processing parameters (e.g. image quality, storage options, transmission options, etc.), enable them to store or transmit captured images, and provide controls on the overall whiteboard content capture process. An example whiteboard capture application according to embodiments is discussed in more detail below in conjunction with FIG. 3.

Embodiments are not limited to the components or functionality of example system 100 of FIG. 1. A whiteboard capture system may be implemented with fewer or additional components, different communication methods, configuration options, and functionalities using the principles described herein.

Figure 2:
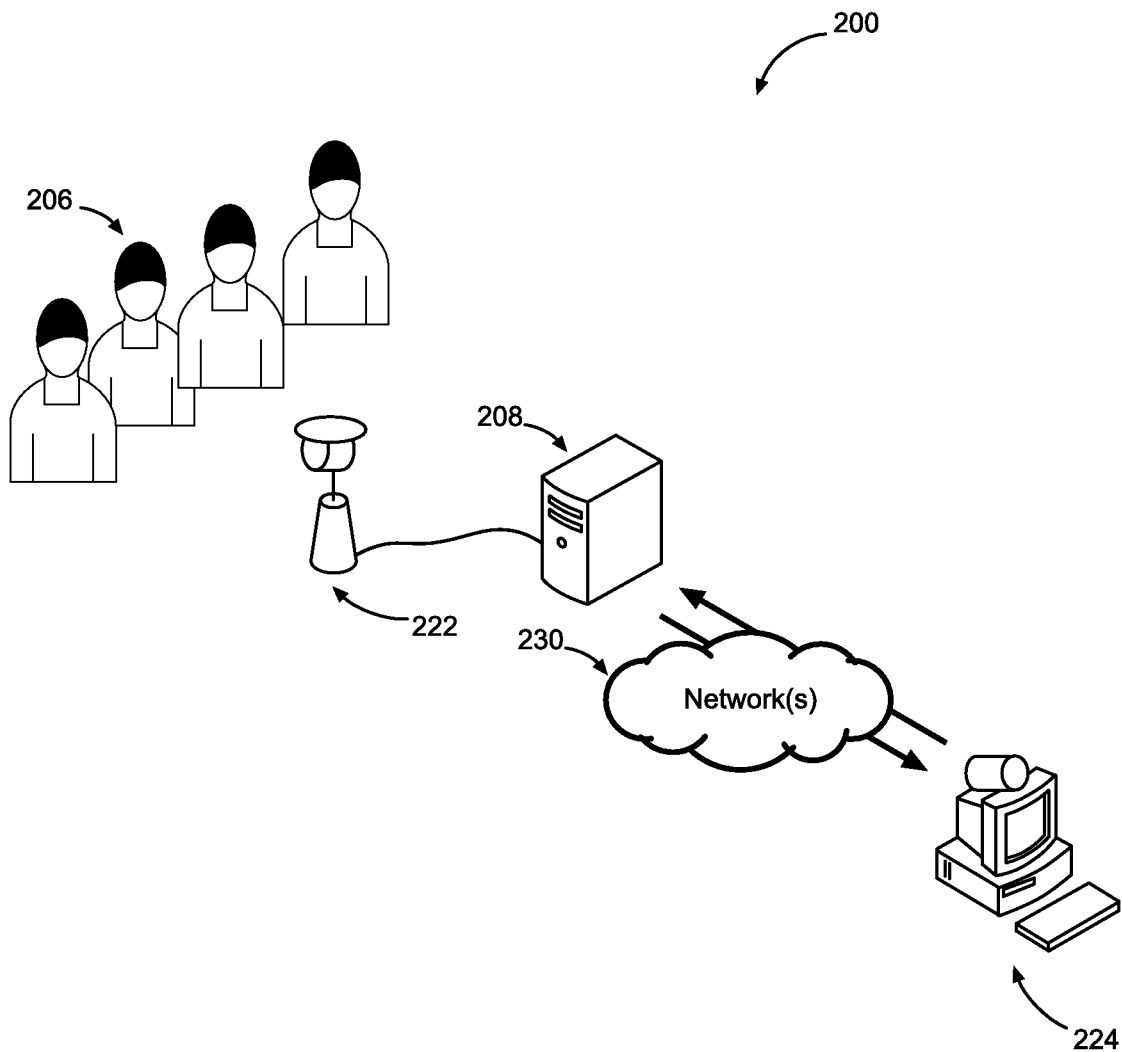
FIG. 2 is a conceptual diagram illustrating main components in a video conference system where whiteboard capture may be employed according to embodiments.

FIG. 2 is a conceptual diagram illustrating main components in a video conference system where whiteboard capture may be employed according to embodiments. Video conferencing systems allow for meetings to occur with visual interaction despite the fact that meeting participants may be located in different geographic locations. The visual aspect of video conferencing makes it typically more appealing than telephone conferences, while at the same time being a lower-cost alternative to (and typically can occur on shorter notice than) in-person meetings when one or more participants must travel to the meeting location.

A typical video conference system 200 includes computing device 208 (e.g. a server) connected to the source for the audio/video signals, which may be a base unit 222 capable of capturing audio and video. Other implementations may include audio/video capture devices with their own processing and communication capability, client devices with video capability, and the like. Video communication begins at computing device 208 with a video capture application, which captures frames of video through the camera. The video signal may first be processed then transmitted through one or more networks (230) to a corresponding computing device/ capture device 224. A video conference may involve participants 206, but also capture of content from a display device such as a screen or contents of a whiteboard. Video conference may include interactive communications (bi- or multi-directional communication) as well as unidirectional real time communications such as a video seminar that is disseminated to multiple receivers.

Conference rooms equipped with video conferencing equipment may include a wide variety of video capture devices of a broad spectrum from webcams to sophisticated camera systems with panoramic and/or focused image capture capabilities. The capture systems may also employ image processing techniques for improvement of image quality, compression of image data, error minimization, and so on. A whiteboard capture system according to embodiments may also utilize an existing video conference capture device (or system) to capture and store/disseminate whiteboard contents. For example, the whiteboard capture application discussed above may be executed in server 208 processing whiteboard contents captured through the base unit 222, in addition or in parallel to the normal video conferencing operations.

Figure 3:
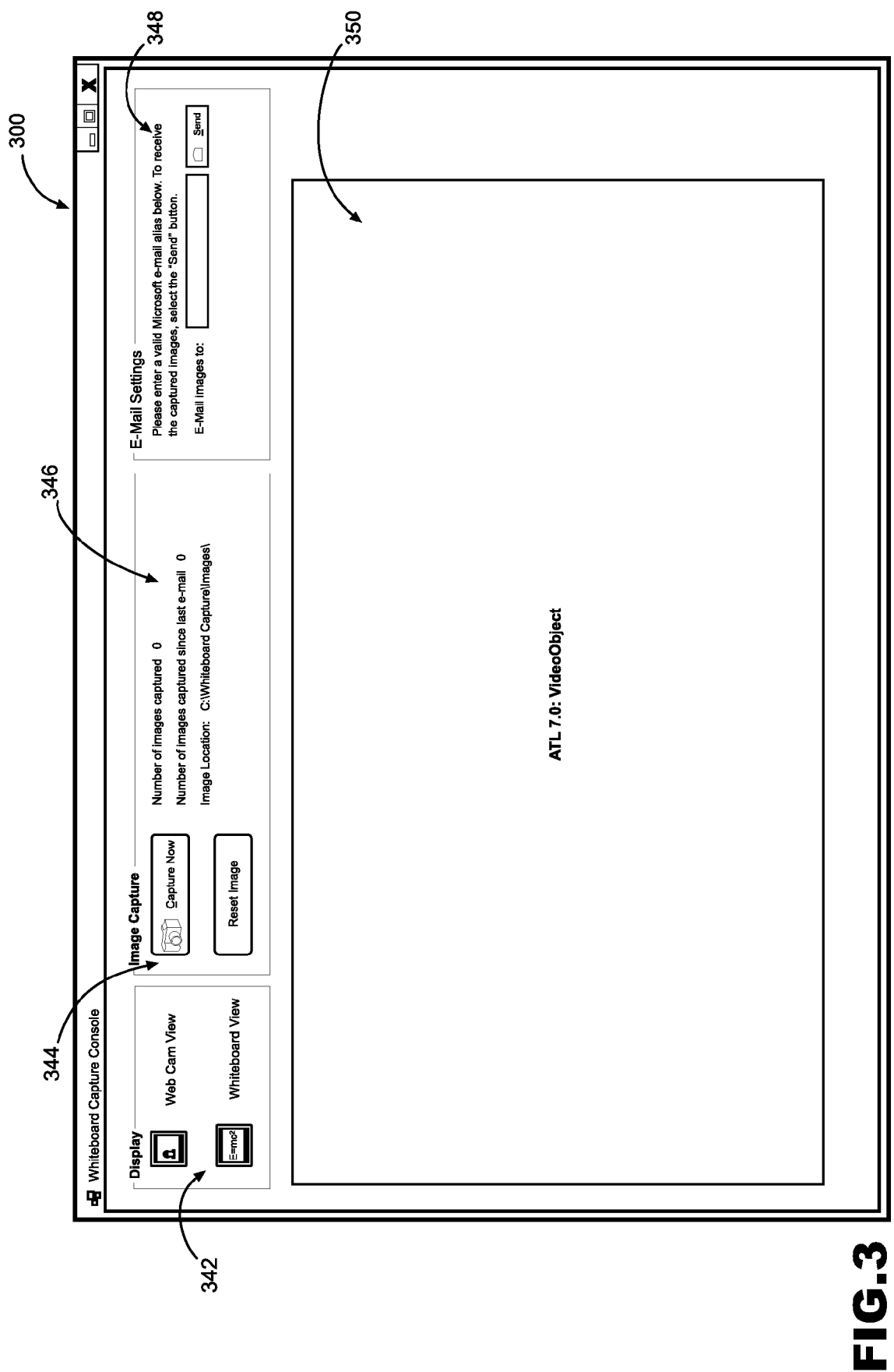
FIG. 3 illustrates an example screenshot of a whiteboard capture application user interface.

FIG. 3 illustrates an example screenshot of a whiteboard capture application user interface. Such an application may be a local application residing on local computing devices or a hosted application executed by a service and used by a client device/application remotely.

The whiteboard application may provide users with the ability to capture an image by the click of a simple button and store locally (e.g. on a hard drive as a standard image). In addition, the application may provide the ability to automatically capture images (without requiring user input at specified intervals) through a configuration file option within the application. When the captured content needs to be distributed, it can be achieved by transmitting the images via electronic mail, instant messaging, uploading, etc.

The whiteboard application may further be configured with features such as processing the captured image, optical character recognition (OCR), integration of captured content into other applications (e.g. a presentation application), or even editing functions allowing user to edit the captured image prior to storage or transmission. The captured images may be stored in a variety of data storage such as portable or permanent local storage devices, networked data stores, and so on. An application according to embodiments may be configured with privacy/security feature such as deleting the whiteboard images at the end of the meeting, enabling only permitted users to receive the captured images, etc. For example, the application may only be activated upon verification of a user's identity according to one embodiment. According to another embodiment, the target addresses for transmitting the captured images may be compared against a permission database and those not permitted may not receive the images. For example, attendees of a private meeting, who were not originally invited to the meeting, may be prevented from receiving the images.

Moreover, the whiteboard capture application may be configured to filter captured images by the image capture device (e.g. a webcam) to eliminate moving portions. For example, a person writing on the board may be removed from the image by filtering logic that can eliminate any moving object and a non-white background leaving only contents of the whiteboard in the image.

User interface 300 illustrates a few basic features of a whiteboard capture application according to embodiments. Selectable controls 342 represented by icons enable a user to switch between a webcam view and whiteboard view (turning the filtering feature ON or OFF). If more than one capture device is utilized or the system is part of a video conference system, these icons may also be used to switch between different capture devices.

Selectable controls 344 enable a user to capture the image upon user indication and reset the captured image. As discussed previously, the application may also be configured to capture the contents automatically without user intervention. User interface portion 346 provides information about captured images such as number of captured images, number of image captured since last transmission (e.g. email), image location (e.g. the local hard drive), and so on. Email settings portion 348 enables the user to enter an email address for sending the images to an addressee. As mentioned before, the images may be transmitted through a variety of ways including, but not limited to, instant message, upload, data sharing application, and so on. Finally, user interface portion 350 displays a currently selected (or last captured) image.

Figure 4:
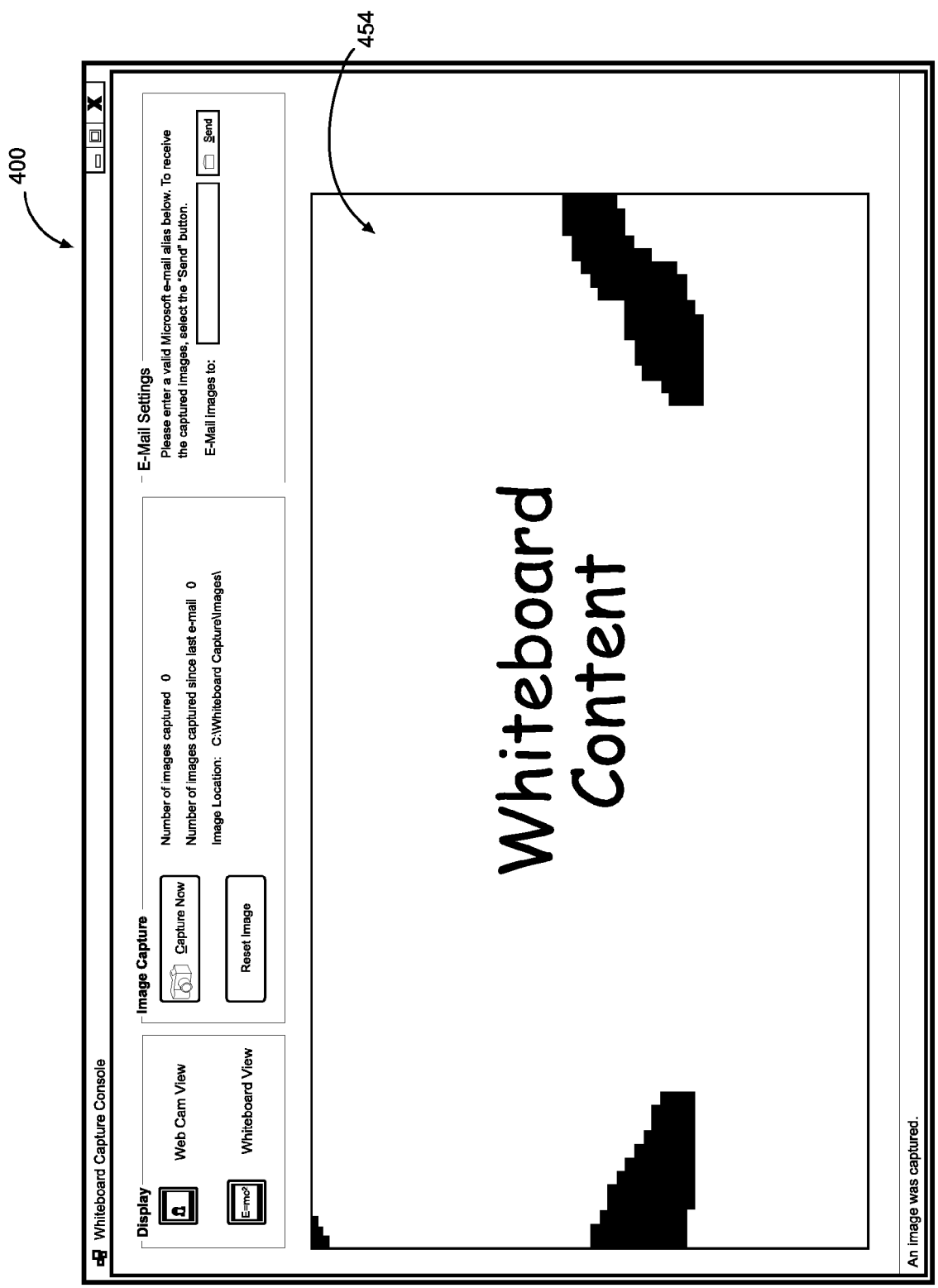
FIG. 4 illustrates another screenshot of the example whiteboard capture application user interface of FIG. 3 with the whiteboard image presented after image processing according to some embodiments.

FIG. 4 illustrates another screenshot of the example whiteboard capture application user interface of FIG. 3 with the whiteboard image presented after image processing according to some embodiments. A number of image processing techniques may be employed to capture the whiteboard contents and/or improve image quality such as movement filtering, sound source localization, and the like. If a sophisticated capture device such as a pan/tilt/zoom capable camera is being used, the processing techniques may be employed to configure the camera parameters. If a simpler and more cost-effective capture device such as a webcam is being used, the techniques may be used on the captured image yielding whiteboard content 454.

The above mentioned techniques and others may be implemented in the whiteboard capture application itself, in a related but separate application, or in the capture device itself (if the capture device is a complex device). Furthermore, these features and others discussed herein may be included in a whiteboard capture system in tiers resulting in a spectrum of whiteboard capture systems from low-end, cost-efficient, simple-to-use systems to high-end, high-quality, more sophisticated systems.

Figure 5:
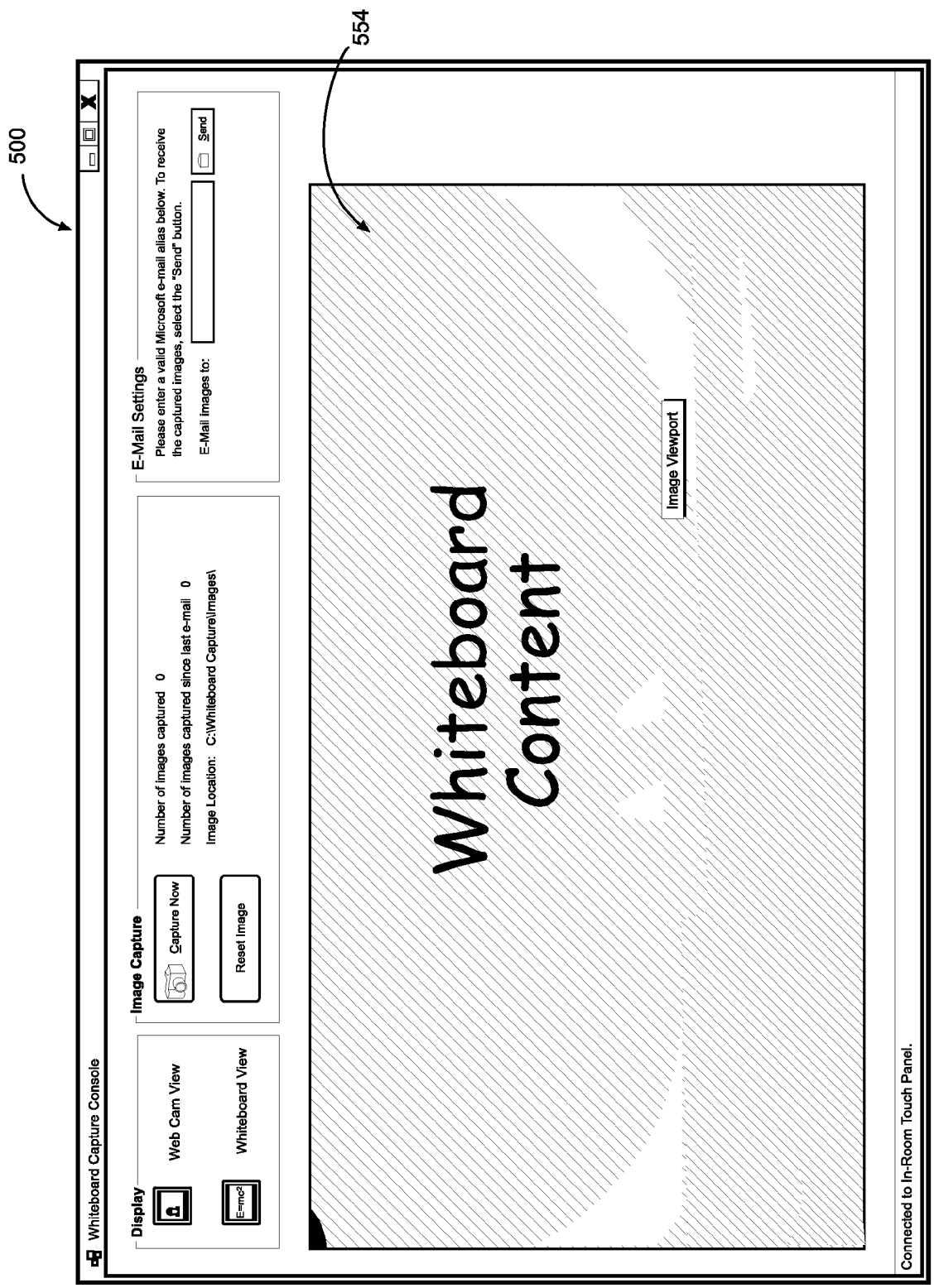
FIG. 5 illustrates a further screenshot of the example whiteboard capture application user interface of FIG. 3 with the whiteboard image presented without image processing according to other embodiments.

FIG. 5 illustrates a further screenshot of the example whiteboard capture application user interface of FIG. 3 with the whiteboard image presented without image processing according to other embodiments. While a low-end, cost-effective whiteboard capture system according to one embodiment may employ minimal or no image processing (and other configuration options such as transmission/storage modes), the image quality may not be as desirable in such as system. Some form of minimal image processing may enable the image (e.g. 554) to be improved for better user experience such as increased contrast, sharpness, and the like.

The methods described above for capturing, processing, transmitting, and storing whiteboard contents are not limited to the listed examples. Other mechanisms and configurations may also be employed for capturing and making available whiteboard contents using the principles described herein.

Figure 6:
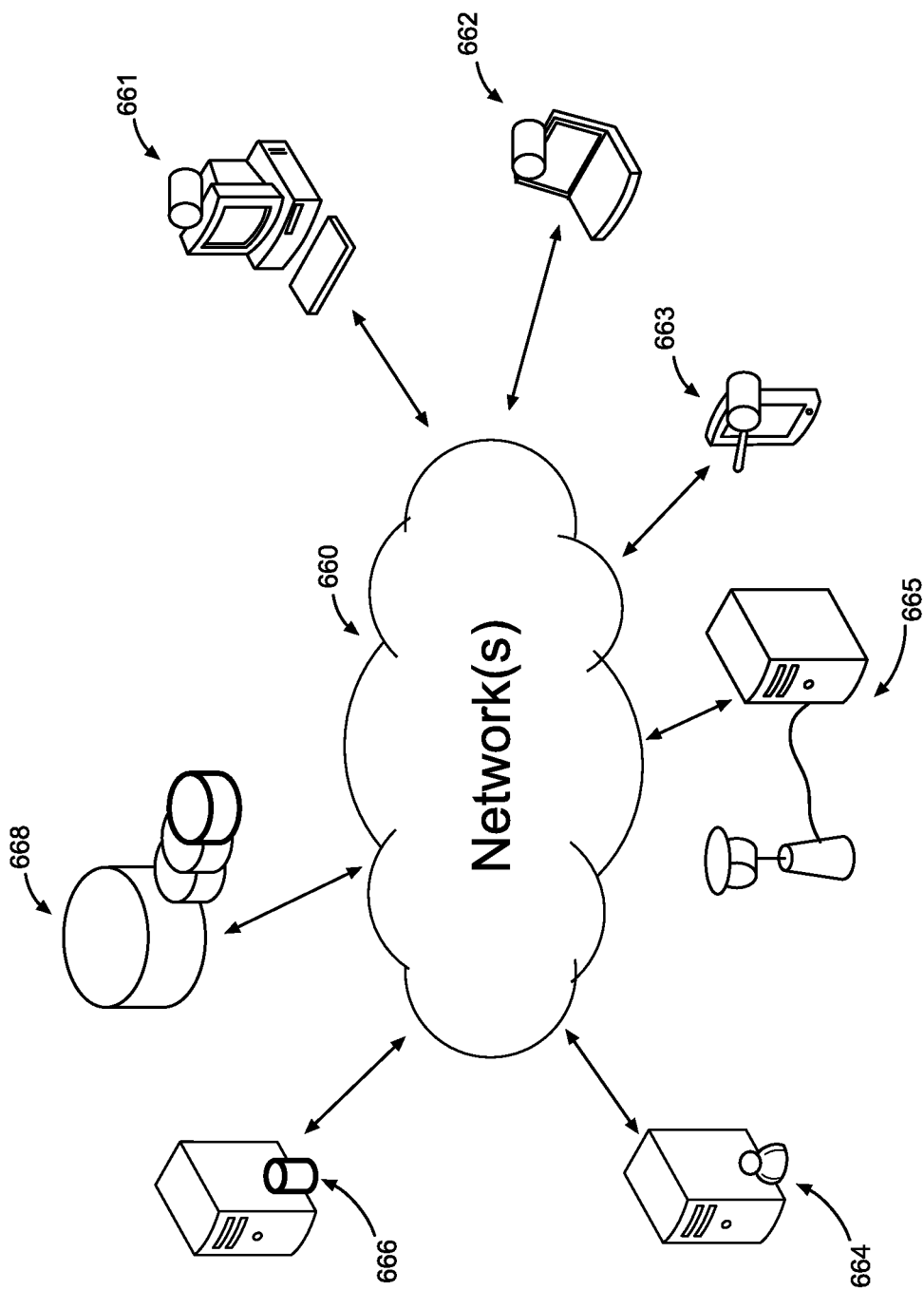
FIG. 6 illustrates a networked environment where embodiments may be implemented.

FIG. 6 is an example networked environment, where embodiments may be implemented. Software based whiteboard capture systems according to embodiments may be implemented locally or in a distributed manner over a number of physical and virtual clients and servers. It may also be implemented in un-clustered systems or clustered systems employing a number of nodes communicating over one or more networks (e.g. network(s) 660).

Such a system may comprise any topology of servers, clients, Internet service providers, and communication media. Also, the system may have a static or dynamic topology. The term "client" may refer to a client application or a client device. While a networked system implementing embodiments may involve many more components, relevant ones are discussed in conjunction with this figure.

Whiteboard capture application(s) may be executed in individual client devices 661-663 with connected image capture devices or server 665 managing a more complex image/video capture unit. Captured images may be stored in a variety of formats directly in a data store such as data stores 668 or through database server 666. Captured images may be provided to recipient through a variety of methods such as email, instant message, and the like, from the capturing through network(s) 660. The transmission of the images as well as other aspects of a system according to embodiments, such as security protocols, may be controlled by a separate computing device/application, such as server 664. The whiteboard capture application may also be executed in server 664 and accessed by the individual client devices as discussed above.

Network(s) 660 may include a secure network such as an enterprise network, an unsecure network such as a wireless open network, or the Internet. Furthermore, a network channel for distributing captured whiteboard content may include a secured channel such as a Secure Socket Layer (SSL) or an unsecure channel. Network(s) 660 provide communication between the nodes described herein. By way of example, and not limitation, network(s) 660 may include wired media such as a wired network or direct-wired connection, and wireless media such as acoustic, RF, infrared and other wireless media.

Many other configurations of computing devices, applications, data sources, data distribution systems may be employed to implement a software based conference room whiteboard capture system. Furthermore, the networked environments discussed in FIG. 6 are for illustration purposes only. Embodiments are not limited to the example applications, modules, or processes.

Figure 7:
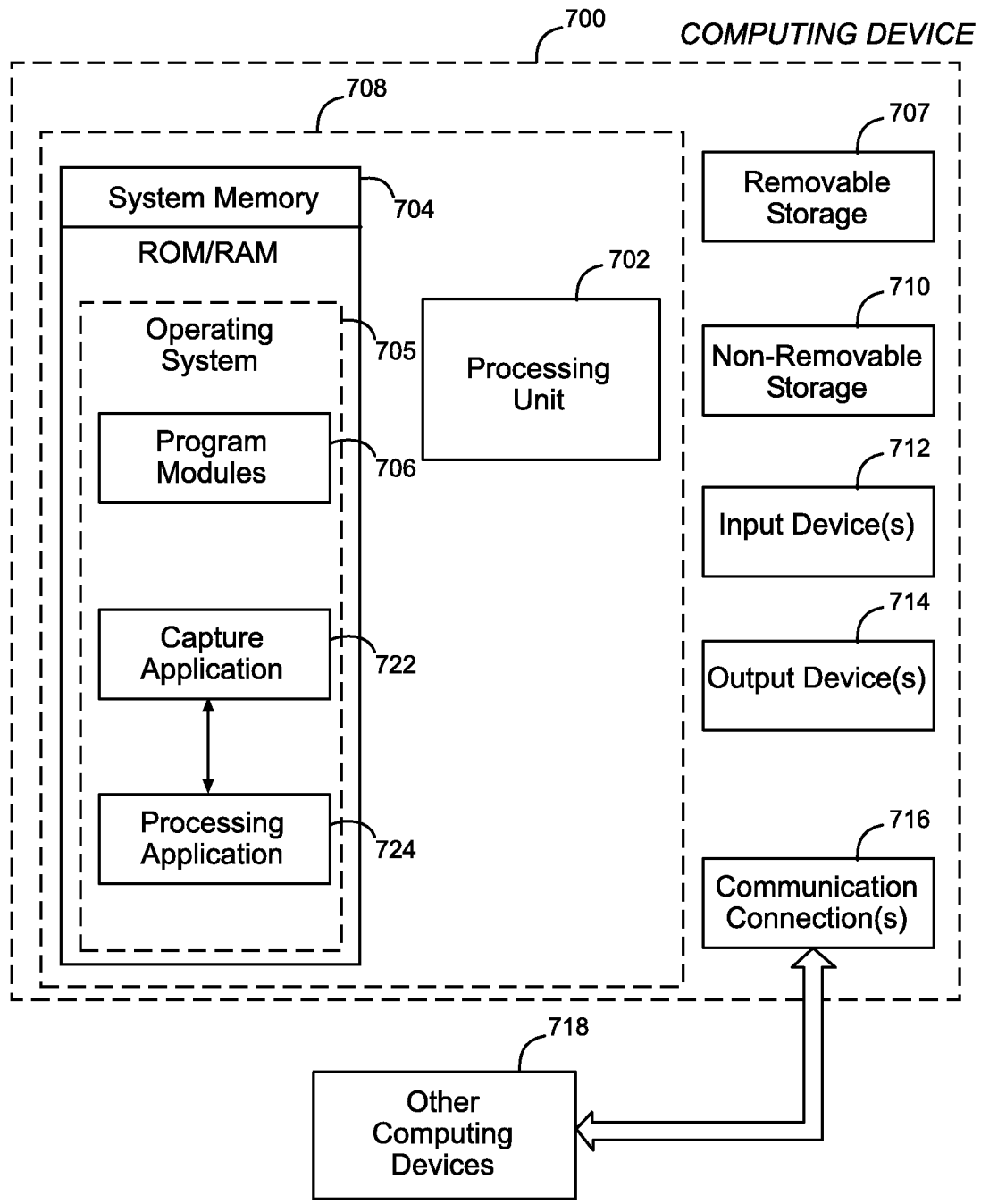
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be an in-room PC or a networked computer executing a whiteboard capture application and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706, whiteboard capture application 722, and processing application 724.

Whiteboard capture application 722 and processing application 724 may be separate applications or integral modules of a hosted service application that provides whiteboard content capture services. This basic configuration is illustrated in FIG. 7 by those components within dashed line 708. Captured images may be stored in local (e.g. removable or non-removable storage 707, 710) or remote storage devices. The images may also be transmitted to recipients at other computing devices 718 through communication connections 716.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 707 and non-removable storage 710. Computer storage media may include volatile and non-volatile, removable and non-removable media implemented in any method or technology for storage of information, such as computer readable instructions, data structures, program modules, or other data. System memory 704, removable storage 707 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included.

The computing device 700 may also contain communication connections 716 that allow the device to communicate with other computing devices 718, such as over a wireless network in a distributed computing environment, for example, an intranet or the Internet. Other computing devices 718 may include client devices or server(s) that execute applications associated with rendering the captured images from whiteboard capture application 722 in computing device 700. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
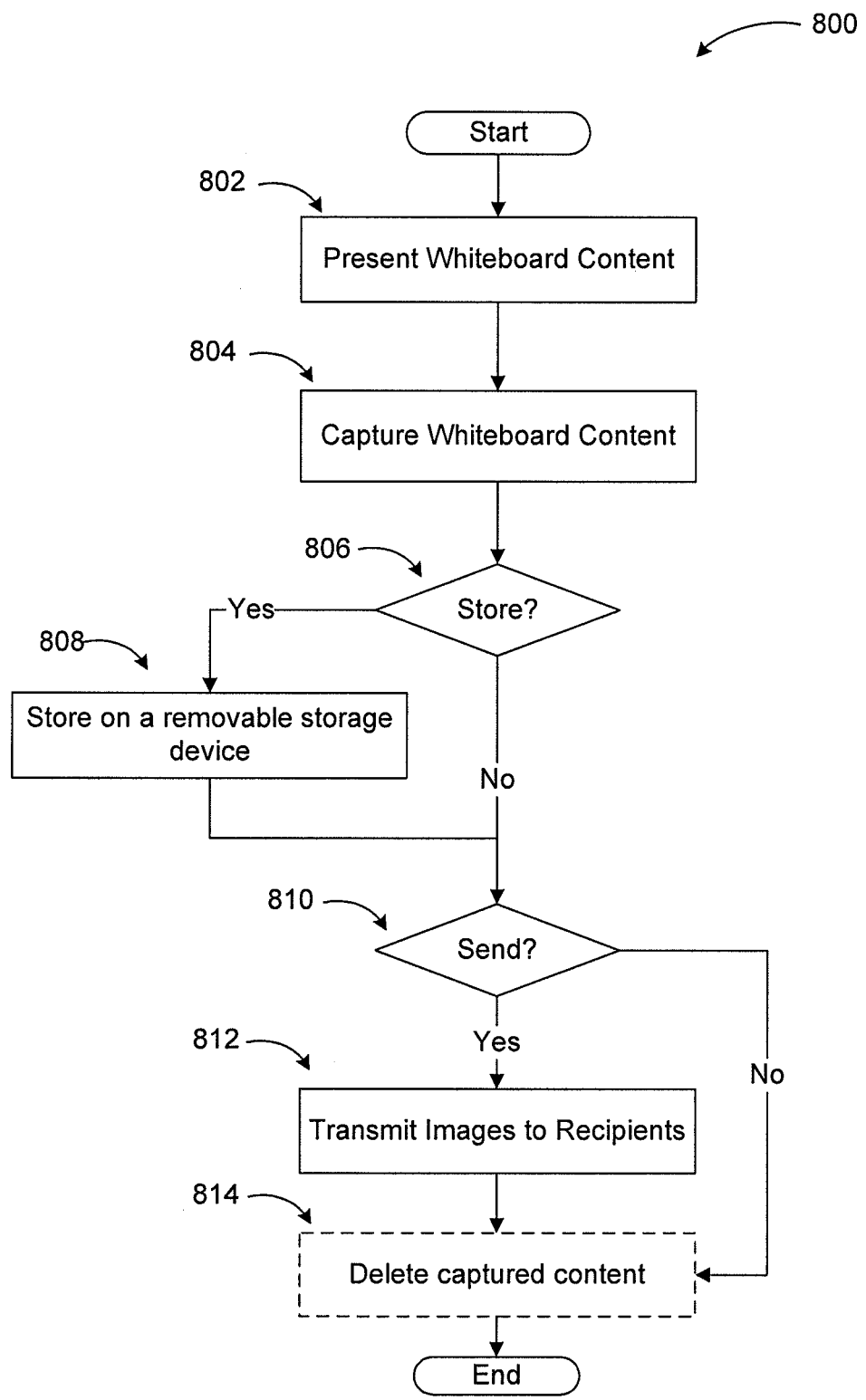
FIG. 8 illustrates a logic flow diagram for a process of capturing whiteboard content according to embodiments.

FIG. 8 illustrates a logic flow diagram for process 800 of capturing whiteboard content according to embodiments. Process 800 may be implemented, for example, by a whiteboard capture application executed in an in-room PC connected to a webcam.

Process 800 begins with operation 802, where whiteboard content is presented to a user (e.g. meeting attendant) indicating how the content would look like once captured. This enables the user to modify image capture device settings, change room lighting, or even make changes to the whiteboard before the content is captured. Processing advances from operation 802 to operation 804.

At operation 804, the whiteboard content is captured upon user indication or automatically by the image capture device. The captured image may be processed based on the capabilities of the system and user-defined or default configuration parameters. The processing may be after the capture or in conjunction with the capture such that the capture process is optimized based on configured processing parameters. The user may be enabled to further process or even edit the captured image after the capturing is complete. Processing advances from operation 804 to decision operation 806.

At decision operation 806, a determination is made whether the captured image is to be stored. If the image is to be stored (user indication or default parameter), it may be stored on a removable storage device at operation 808. The image may also be stored on a local hard drive, a networked data store, and the like. If the image is not to be stored or has been stored, processing advances to decision operation 810.

At decision operation 810, a determination is made whether the captured image(s) (multiple whiteboard captures may be stored and transmitted at the end of the meeting) are to be transmitted to one or more recipients, who may be meeting attendees or designated others. If the images are to be transmitted, processing moves to operation 812.

At operation 812, the captured whiteboard content images are transmitted to user-defined or automatically determined recipients through the methods described previously. Processing moves from operation 812 to optional operation 814. At optional operation 814, the captured images may be deleted from the local computing device for security and/or privacy reasons.

The operations included in process 800 are for illustration purposes. Software based whiteboard capture may be implemented by similar processes with fewer or additional steps, as well as in different order of operations using the principles described herein. for example, a format of the captured image for transmission or storage may be determined during one of the operations and the image saved or reformatted according to the determined format.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for capturing whiteboard content, the method comprising:
    determining whether a background color of the image is non-white;
    when the background color is determined to be non-white, determining whether the capture device has parameters that are configurable;
    when the capture device is determined to have parameters that are configurable:
        configuring the parameters to remove the non-white background from images obtained by the capture device, thereby yielding whiteboard content;
    capturing whiteboard content through an image capture device;
    locally caching the captured content;
    when the capture device is determined to have parameters that are not configurable:
        allowing a user to select between two filtering modes for the captured content, including:
            a first filtering mode in which the captured content is modified to remove moving objects, persons and a non-white background, thereby leaving the whiteboard content; and
            a second filtering mode in which the captured content is unmodified; presenting the captured content to a user;
    in response to receiving a user indication for transmitting the captured content to at least one recipient, transmitting the captured content to the at least one recipient through one of a default transmission mode and a user-defined transmission mode;
    in response to receiving a user indication to store the captured content, storing the captured content in at least one of a local data store and a remote data store; and
    deleting the locally cached captured content.

2. The method of claim 1, wherein the transmission mode includes at least one from a set of: an instant message, an electronic message, a data sharing application session, and a data upload session.

3. The method of claim 1, wherein the whiteboard content is captured through one of: an automatic capture mode and a user-initiated capture mode.

4. The method of claim 1, further comprising at least one from a set of:
    integrating the captured content into one of: a presentation document, a word processing document, a spreadsheet document, a markup language document, and an electronic mail document; and
    enabling a user to edit the captured content.

5. The method of claim 1, wherein the image capture device includes one of: a webcam, a digital camera, a panoramic camera, and a video conference camera system.

6. The method of claim 1, wherein the image capture device is controlled by at least one from a set of: an in-room computer, a remote server, and a client device associated with one of meeting participants.

7. The method of claim 1, wherein the recipient includes at least one of: a meeting participant and a remote user.

8. The method of claim 1, transmitting the captured content includes transmission to at least one remote computing device through at least one of a wired and a wireless network.

9. The method of claim 1, further comprising:
    reformatting the captured content based on one of a default image format and a user-defined image format.

10. A computing device for capturing whiteboard content, the computing device comprising:
    a memory;
    a communication module coupled to an electronic image capture device; and
    a processor coupled to the memory and the communication module, the processor capable of executing a whiteboard capture application configured to:
        determine whether a background color of the image is non-white;
        when the background color is determined to be non-white, determine whether the capture device has parameters that are configurable;
        when the capture device is determined to have parameters that are configurable:
            configure the parameters to remove the non-white background from images obtained by the capture device, thereby yielding whiteboard content;
        cause the electronic image capture device to capture the whiteboard content in response to a user indication;
        save the captured content in the memory;
        when the capture device is determined to have parameters that are not configurable:
            provide user options to filter the captured content including:
                a first filtering mode in which the captured content is modified to remove moving objects and a non-white background, thereby leaving the whiteboard content; and
                a second filtering mode in which the captured content is unmodified;
        provide user options for storing the captured content employing a selected format in one of a local data store and a remote data store coupled to the computing device through a network;
        in response to receiving a user selection for storing the captured content and the format, store the captured content in the selected data store employing the selected format;
        provide user options for transmitting the captured content to at least one recipient employing a transmission mode comprising one of: an electronic mail, an instant message, a data sharing session, and an upload session;
        in response to receiving a user selection for transmitting the captured content, transmit the captured content via the selected transmission mode; and
        upon receiving a user indication, delete the captured content saved in the memory.

11. The computing device of claim 10, wherein the whiteboard capture application is further configured to:
    transmit the captured content to a recipient only if the recipient is authorized to receive the captured content.

12. The computing device of claim 11, wherein the whiteboard capture application is further configured to determine if the recipient is authorized to receive the captured content by confirming an identity of the recipient as being a safe address.

13. The computing device of claim 10, wherein the communication module is further coupled to a plurality of peripheral devices including at least one from a set of: a projection screen, a display monitor, a mouse, a keyboard, and an external storage device through one of a wired connection and a wireless connection.

14. The computing device of claim 10, wherein the computing device is further configured to facilitate one of a video conference and an online meeting, and wherein the whiteboard capture application is further configured to:
   integrate the captured content into electronic media employed in association with the facilitated one of the video conference and the online meeting.

15. The computing device of claim 14, wherein the electronic image capture device is a camera also used for the facilitated one of the video conference and the online meeting.

16. A system to capture whiteboard content, comprising:
   a capture device;
   a processor; and
   a memory containing instructions, which when executed by the processor, causing the system to be operable to:
      capture an image of a whiteboard using the capture device;
      determine whether a background color of the image is non-white;
      when the background color is determined to be non-white;
      determine whether the capture device has parameters that are configurable;
      when the capture device is determined to have parameters that are configurable, configure the parameters to remove the non-white background from a new captured image, thereby yielding whiteboard content; and
      when the capture device is determined to not have parameters that are configurable, perform filtering on the image to remove the non-white background, thereby yielding whiteboard content.

17. The system of claim 16, wherein the parameters are further configurable to adjust at least one of: a contrast and a sharpness of the image.

18. The system of claim 16, wherein instructions executable by the processor are further operable to:
   detect a moving in the image; and
   when a moving object has been detected, remove the moving object from the image.

19. The system of claim 16, wherein the filtering performed on the image includes sound source localization.

20. The system of claim 16, wherein the capture device is operable to capture the image as a still image from a video and integrate the still image into electronic media employed in association with a video conference.

* * * * *